United States Patent [19]

Blake et al.

[11] 4,160,355
[45] Jul. 10, 1979

[54] FORAGE HARVESTER AND ROW CROP ATTACHMENT THEREFOR

[75] Inventors: Nathan L. Blake, Coldwater; Robert A. Stelzer, Celina, both of Ohio

[73] Assignee: Avco Corporation, Wilmington, Mass.

[21] Appl. No.: 746,673

[22] Filed: Dec. 2, 1976

Related U.S. Application Data

[63] Continuation-in-part of Ser. No. 599,929, Jul. 28, 1975, abandoned.

[51] Int. Cl.² .................................... A01D 45/02
[52] U.S. Cl. .................................... 56/98
[58] Field of Search ............... 56/13.9, 98, 106, 119

[56] References Cited

U.S. PATENT DOCUMENTS

| | | | |
|---|---|---|---|
| 2,442,520 | 6/1948 | Van Sickle | 56/119 X |
| 3,365,867 | 1/1968 | Phillips | 56/119 X |
| 3,375,646 | 4/1968 | Dion | 56/98 |
| 3,380,233 | 4/1968 | Fergason | 56/119 |
| 3,400,524 | 9/1968 | Segredo | 56/98 |
| 3,585,789 | 6/1971 | Blanshine | 56/98 |
| 3,670,482 | 6/1972 | Blanshine et al. | 56/98 |
| 3,736,733 | 6/1973 | Fell et al. | 56/98 |
| 3,916,605 | 11/1975 | Richards et al. | 56/13.9 X |

*Primary Examiner*—Louis G. Mancene
*Assistant Examiner*—Mickey Yu

*Attorney, Agent, or Firm*—Abraham Ogman; Charles M. Hogan

[57] ABSTRACT

A forage harvester and fixed-construction row crop attachment therefor are disclosed. The attachment has three plant-receiving passages consisting of a central passage and a pair of side passages on opposite sides of the central passage. Each passage has an inner or channel section comprised of substantially parallel walls, an intermediate section or throat comprised of outwardly diverging intermediate walls and an outer section or mouth comprised of outwardly diverging outer walls. A cutter is provided in association with each of the throats or intermediate sections. Each of the intermediate walls of each side passage is constructed and arranged to define a comparatively wide cut-off area at the bottom. The cutter associated with the intermediate section or throat of each side passage is arranged adjacent its cut-off area. The comparatively wide cut-off areas and associated cutters cooperate with gathering chain sets to assure harvesting of plants having both narrow and wide row spacings. In the case of narrow row spacings the cut stalks are maintained in an upright attitude and swept rearwardly and in outboard directions from the wide cut-off areas to the relatively narrow intermediate sections whereat the gathering sets take hold of the crop. This maintenance of position and sweeping is accomplished by wall shaping and gathering set location.

3 Claims, 11 Drawing Figures

FORAGE HARVESTER AND ROW CROP ATTACHMENT THEREFOR

BACKGROUND OF THE INVENTION

This patent application is a continuation-in-part of our patent application Ser. No. 599,929, filed in the United States Patent Office on July 28, 1975, entitled "Forage Harvester and Row Crop Attachment Therefor", and now abandoned.

Row crops such as cane, sorghum, corn and the like are usually machine planted in substantially parallel rows which vary in spacing usually from 28 inches to 38 inches. A particular farmer will plant crops in either narrowly spaced rows, such as 28 inches, for example, while another farmer will plant crops in more widely spaced rows, such as 38 inches. If farmer involved decided to provide his own forage harvesting equipment, then he would purchase equipment suited to his type of either narrow or wide row plantings. However, in order to forego the cost of an entire forage harvester or the cost of an attachment for use on existing equipment, many farmers employ an independent contractor or "custom operator" to harvest their forage row crops. It will be readily apparent that such an operator should have equipment capable of harvesting row crops in narrow or wide rows.

When mechanical planting equipment is used all rows in a particular field will not have the same exact spacing. Thus, if only a wide row forage harvester were to be employed to harvest the resulting crop, the harvesting result in substantial loss or in an inefficient harvesting action. Further, regardless of the row spacing of a particular planter the resulting crop of a particular row will not grow in a perfect rectilinear path.

Due to well-defined standards of yields of row crops, row crop forage harvesters must take into consideration optimum row spacing limits for maximum wheel spacing of a vehicle structure required for a forage harvester, location and type of cutting devices relative to the vehicle wheels, and construction, arrangement and size of plant-receiving passages. Fixed or nonadjustable three-row forage harvesters have heretofore been proposed. However, these three-row harvesters are specifically designed to harvest either crops planted in narrow rows or crops planted in wide rows, but not both. Attempts to make a three-row harvester adjustable so that it might handle both narrow and wide rows have resulted in substantial mechanical complexities and prohibitive costs whereby the need exists for a three-row forage harvester of simple, fixed, nonadjustable construction which is capable of harvesting, with optimum efficiency, row crops planted in both narrow and wide rows.

Efforts have been made heretofore to provide a row crop forage harvester capable of being used to harvest plants or crops planted in both narrow and wide rows. However, because of the above-mentioned considerations dealing with vehicle wheel spacings, cutting devices and plant-receiving passages, such harvesters have been two-row harvesters.

SUMMARY OF THE INVENTION

This invention provides an improved row crop forage harvester and an improved row crop attachment therefor which is of fixed or nonadjustable construction but is capable of simultaneously harvesting three rows of crops. Satisfactory harvesting is accomplished when the three rows are spaced apart from 24 inches to 42 inches and optimum harvesting action is achieved when the three rows are spaced apart from 28 inches to 38 inches.

The harvester and attachment of this invention have three plant-receiving passages consisting of a central passage and a pair of side passages on opposite sides of the central passage. Each of the passages has an inner section or channel comprised of substantially parallel walls, an intermediate section or throat forwardly of the inner section and comprised of outwardly diverging intermediate walls, and an outer section or mouth forwardly of the intermediate section and comprised of outwardly diverging outer walls. Cutting means is provided in association with each of the intermediate sections and the intermediate section or throat of each side passage is constructed and arranged to define a comparatively wide cut-off area at its bottom. The cutting means of each side-passage intermediate section is arranged adjacent its comparatively wide cut-off area. The comparatively wide cut-off areas and associated cutting means cooperate with shaped walls and gathering means to assure proper harvesting from the side rows of plants having row spacings of the magnitude mentioned above.

Therefore, it is an object of this invention to provide a three-row row crop attachment for a forage harvester of fixed or nonadjustable construction and an improved forage harvester utilizing same wherein such row crop harvester and attachment are particularly adapted to harvest crops planted in rows, as mentioned above.

It is another object of this invention to provide a row crop attachment and a forage harvester using same having one or more of the novel features set forth above or hereinafter shown or described.

Other objects, details, uses and advantages of this invention will become apparent from the embodiment thereof presented in the following specification, claims and drawings.

BRIEF DESCRIPTION OF THE DRAWINGS

The accompanying drawings show the presently preferred embodiment or best mode of this invention, in which.

DESCRIPTION OF ILLUSTRATED EMBODIMENT

Figure 1:
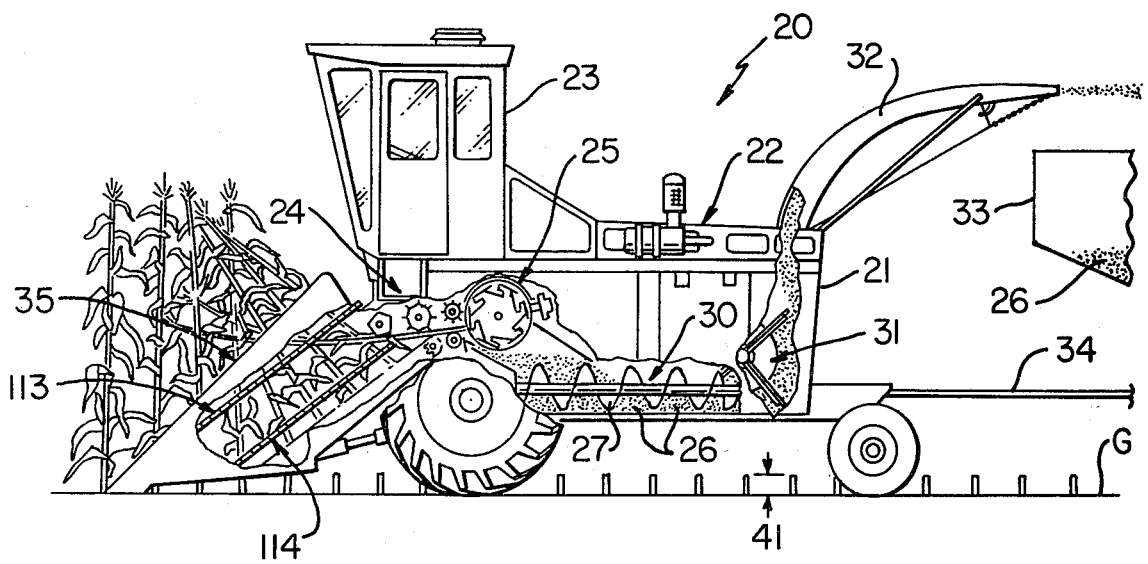
FIG. 1 is a side view, with parts broken away, schematically illustrating the forage harvester and three-row row crop attachment of this invention as used to harvest an exemplary row crop of corn.

Reference is now made to FIG. 1 of the drawings which illustrates one exemplary embodiment of a forage harvester of this invention, designated generally by the reference numeral 20 and of the type particularly adapted to harvest row crops such as cane, sorghum, corn and similar stalk crops. In this example the drawings and detailed description are presented in connection with the harvesting of corn.

The forage harvester 20 comprises a farm vehicle having the usual body 21 housing an engine 22 and provided with an operator's cab 23. The harvester 20 has conveying means indicated at 24 for conveying the cut corn plants with their cut stalk ends first to chopping means or a chopper indicated at 25 for chopping the entire corn plant into pieces 26 of a predetermined size range. The cut pieces 26 are transported by an auger 27 along a passage 30 at the bottom of the harvester body and are picked up by a blower assembly 31 which forcefully propels the chopped particles through a curved chute 32 into a suitable container 33 usually towed by the harvester 20 using a tow bar 34, or the like.

The harvester 20 includes an attachment which is designated generally by the reference numeral 35 and is particularly adapted for harvesting three rows of row crops simultaneously. Such three rows may vary in spacing from 24 inches to 42 inches, it being understood that optimum harvesting efficiency is obtained when harvesting row crops in rows which may vary in spacing from 28 to 38 inches.

Figure 2:
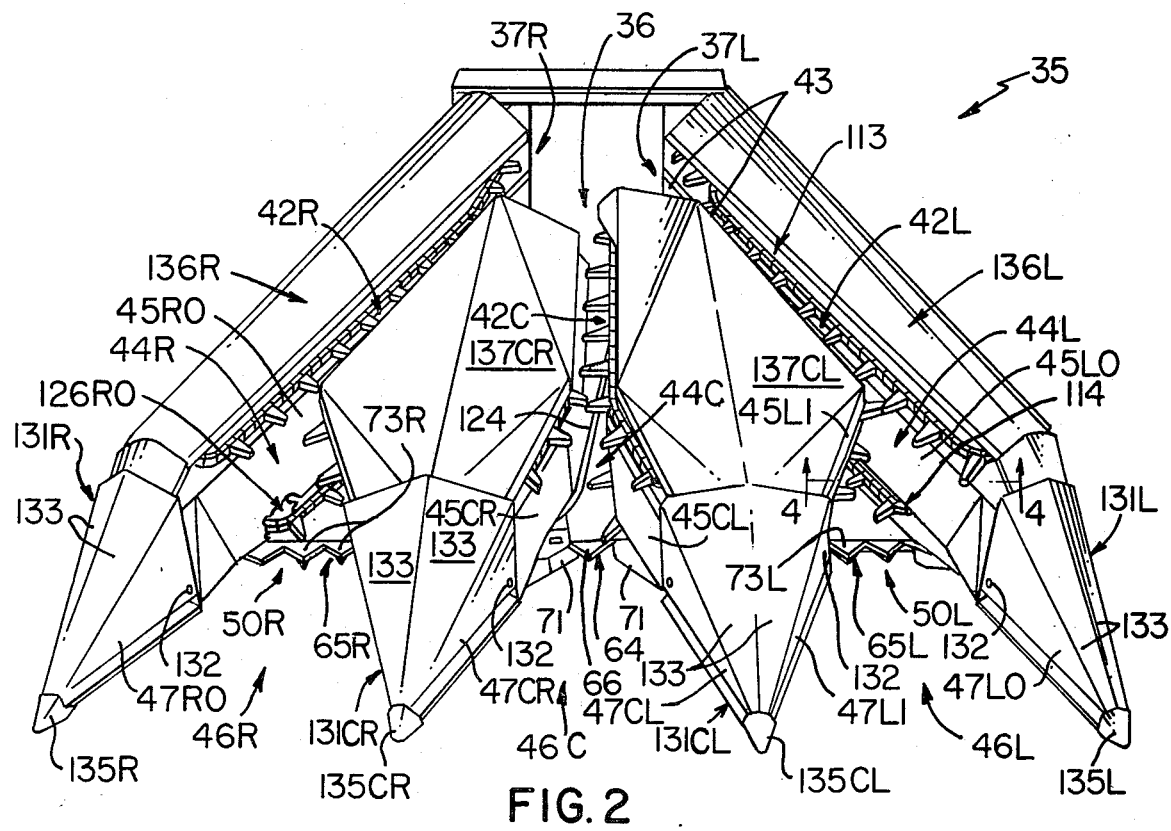
FIG. 2 is a front perspective view of the row crop attachment of this invention.

Referring now to FIG. 2 of the drawings, it will be seen that the exemplary row crop attachment 35 for the forage harvester 20 has a plurality of three plant-receiving passages consisting of a central passage 36 and a pair of side passages 37R, 37L arranged in a symmetrical manner on opposite sides of the central passage 36. As is well known in harvesting row crops, an operator will operate the harvester 20 so that it moves substantially with its central passage 36 aligned with a center row of crops and the crops in such center row are easily cut and moved along the central passage 36 the full length of the attachment. However, depending upon the spacing between rows the plants may not be received in the centers of the side passages 37R, 37L. Nevertheless, the attachment 35 is so constructed that plants may be in rows which may vary within the limits previously indicated yet cutting means designated generally by the reference numeral 40, per FIG. 3, associated with the passages 36, 37R and 37L will sever the corn plants adjacent the ground at a minimum stubble height, as indicated at 41 in FIG. 1. The cut plants are moved rapidly through the attachment 35 and chopped into pieces 26. Such cutting and movement will be described in more detail subsequently.

Figure 6:
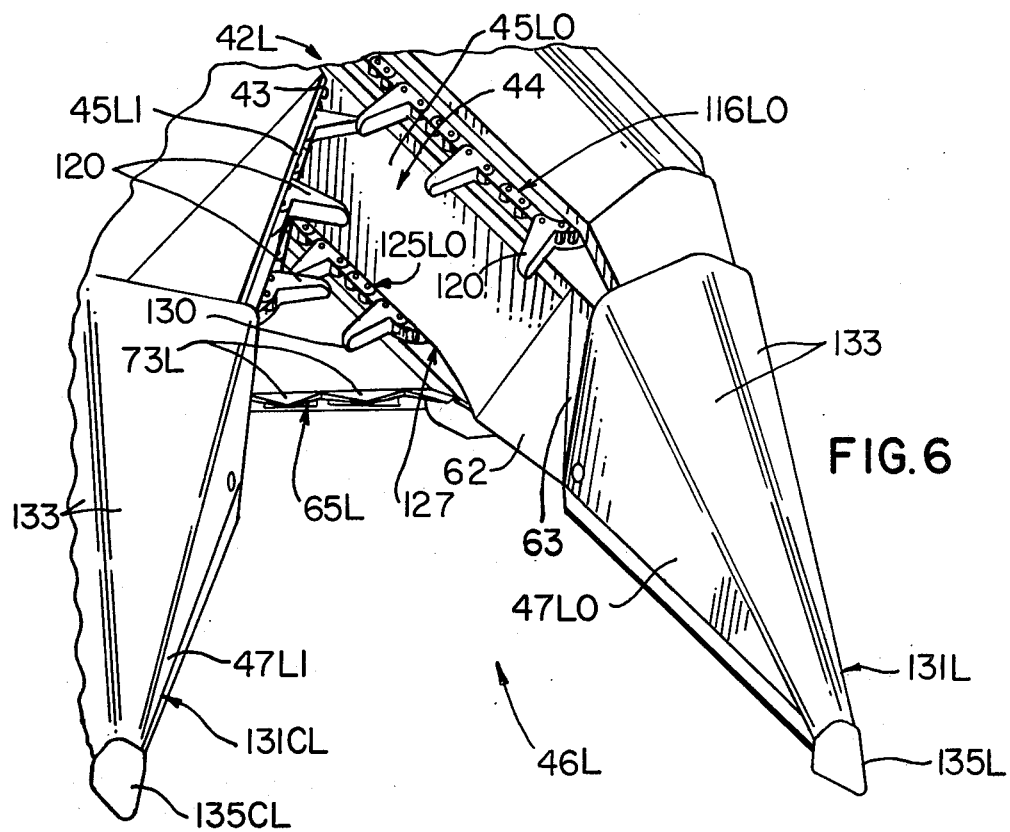
FIG. 6 is an enlarged fragmentary perspective view of the left-hand plant-receiving side passage of the attachment.

As best seen in FIGS. 2 and 6, there are three plant-receiving passages 36, 37R and 37L. The left-hand passage 37L has an inner channel section 42L, which is comprised of substantially parallel walls 43. Forwardly of the inner section is an intermediate section or throat 44L comprised of outwardly diverging intermediate walls 45LI and 45LO (the "L" standing for left, and the "I" for inboard, and the "O" for outboard). The passage 37L further comprises an outer section 46L adjoining the forward end of the intermediate wall section or mouth and comprised of outwardly diverging outer walls 47LI and 47LO. In a similar manner, but arranged symmetrically with respect to the left-hand passage 37L, the right-hand passage 37R comprises an inner channel section 42R having parallel walls, an intermediate section or throat 44R adjoining the inner section and comprised of outwardly diverging intermediate walls, such as 45RO, and an outer section or mouth 46R adjoining the intermediate wall section, the outer section being composed of outwardly diverging outer walls such as 47RO. The inner passage 36 comprises an inner section or channel 42C, having substantially parallel walls, intermediate section or throat 44C adjoining the inner section and comprised of outwardly diverging intermediate walls 45CR and 45CL (the "C" standing for center). The passage 36 further comprises an outer portion or mouth 46C comprised of outwardly diverging outer walls 47CR and 47CL. The intermediate walls of each side passage, such as 37L, are constructed and arranged to define a comparatively wide cut-off, such as area 50L or 50R, at its bottom and the cutting means associated with the intermediate walls of each side passage is arranged adjacent its associated comparatively wide cut-off area whereby the comparatively wide cut-off areas and associated cutting means cooperate with gathering means (to be described later) of the attachment 35 to assure harvesting of plants having row spacings which may vary substantially.

Figure 10:
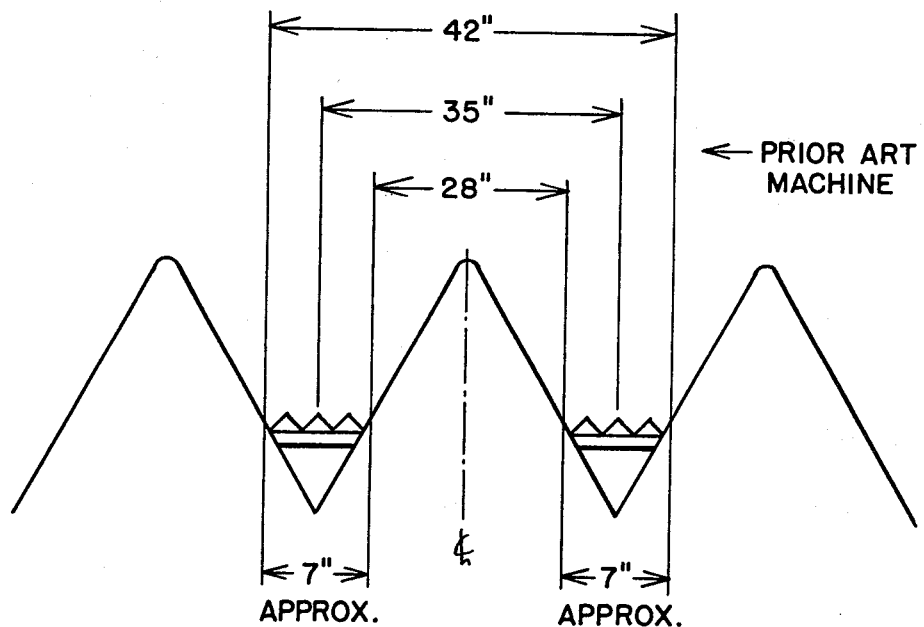
FIG. 10 is a schematic illustrating a constraint on a two-row prior art row-range machine.
Figure 11:
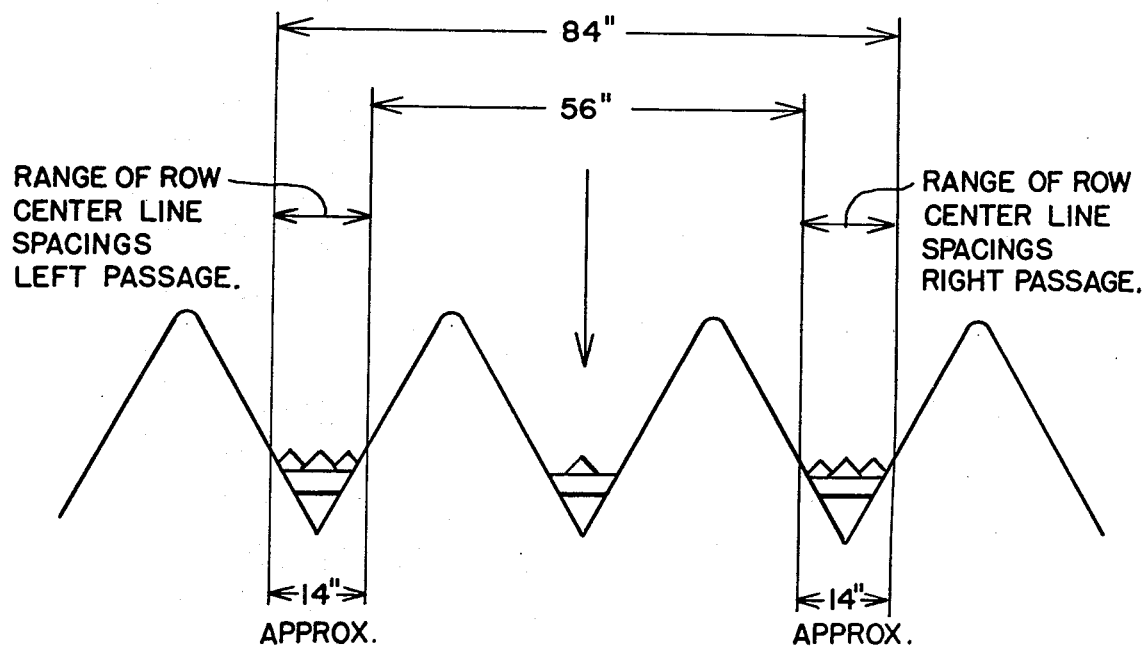
FIG. 11 is a schematic illustrating one of the constraints on the side passages of the three-row row-range machine according to the invention.

At this point note is made of a radical difference between the problems involved in providing capabilities to accommodate variations in spacing between rows in a three-row machine and row-spacing variance capability in a two-row machine. Assume that the machine of the Phillips patent, U.S. Pat. No. 3,365,867, is used with rows nominally spaced 35 inches apart. Throats 18, 18, each 7 inches in width, then permit usage with rows spaced at points within a range of from 28 inches through 42 inches (FIG. 10). Assume now a three-row machine having a nominal row-to-row spacing of 35 inches. Give the center throat a range of 7 inches. It will be seen that the prior art throat width of about 7 inches is needed to allow the harvester operator to steer the machine down the center one of the three rows, regardless of row-to-row spacing (FIG. 11). In a three-row machine the center throat width is not required to accommodate a range of center row spacing. However, each of the side throats must be wide enough to accept a range of row-to-row spacing which can vary as much as 14 inches. In practice we prefer a throat and cutter width along line A (FIG. 7) of 13 inches. It will be seen in the light of our findings that the throat or cutter width constraints on the three-row machine are entirely different than those in the two-row machine.

In order successfully to accept a wide range of row spacings, we not only provide wide cutter widths for the side passages but we also shape the forward portions of their diverging walls. For example, left-hand passage walls 45LO and 45LI are formed so as to sweep the upstanding crop from the wide mouth into the narrow passage 42L. We also position the gathering chain sprocket 126LI immediately adjacent a shoulder formation 147 in the fore portion of the inboard wall so that as the sweeping is accomplished the cut crop is immediately picked up by fingers 120 (FIG. 8) of the lower gathering chains (see chains 125LO and 125LI in FIG. 5 and chain 125LO in FIG. 8). The main part of shoulder 147 is above the level of those chains. The shoulder begins at the plane of line A (FIG. 7) and proceeds with an outboard slope and then curves along 146 into slope 155 which merges into the main intermediate portion of wall 45LI. As viewed in FIGS. 7 and 8, portions 51 and 147 of wall 45LI effectively form a concave sweeping surface. Outboard wall 45LO is formed with relatively a smooth fore portion or sweeping surface 62, slightly concave as it joins the main wall 45LO at a slight bend.

The left side passage has been described as illustrative. It should be understood throughout this description that the right-hand passage and its associated cutters and chains are arranged in a similar but symmetrical fashion, the shoulder corresponding to shoulder 147 for the left-hand passage again being in the inboard wall of the right-hand passage. It will further be understood that as the description proceeds the left passage is selected as illustrative and the right passage will be understood to embody the same elements, in symmetrical fashion, except where otherwise indicated.

Figure 4:
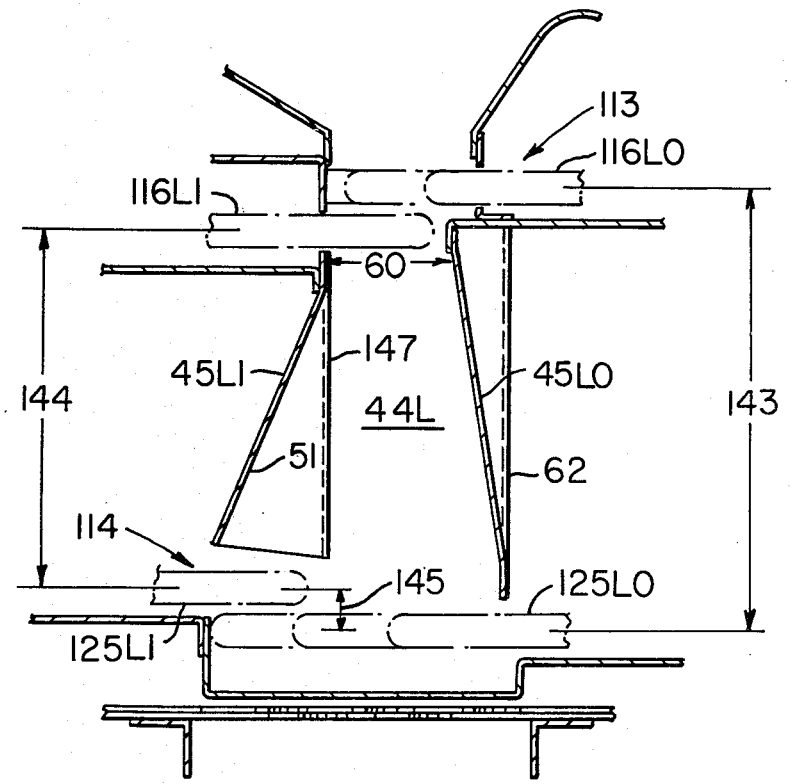
FIG. 4 is a fragmentary cross-sectional view taken essentially on the line 4—4 of FIG. 2.

As best seen in FIG. 4, the intermediate walls 45LO and 45LI of the intermediate sections 44L of the side passage 37L at a location immediately in front of the cut-off plane (of A, FIG. 7) have oppositely arranged surfaces 51 and 62 so inclined that their associated lower edges are spaced apart a substantially greater distance than their top edges. It will be also seen that the inboard one of said forward surfaces 51 is inclined at a greater angle than the oppositely arranged surface 62 to help define the comparatively wide cut-off area at the bottom. The spacing 60 at the top of the channel is proportioned to be wide enough to keep the stalks from jamming in the passage.

Fin 151 is in continuity with and extends below the frontal wall portion 51 of the left-hand passage inboard wall. In continuity with the element 62 but generally above and forwardly of the left-hand passage outboard wall is a surface 63. Again, the right-hand passage is arranged in symmetrical fashion.

The cutting means 40 of the attachment 35 (FIG. 3) is defined by sections comprised of a central section or cutter 64, associated with the intermediate walls and throat of the central passage 36 and a pair of side sections or cutters 65L and 65R arranged on opposite sides of section 64. Each side section associates with the intermediate walls and throat of a side passage.

Figure 3:
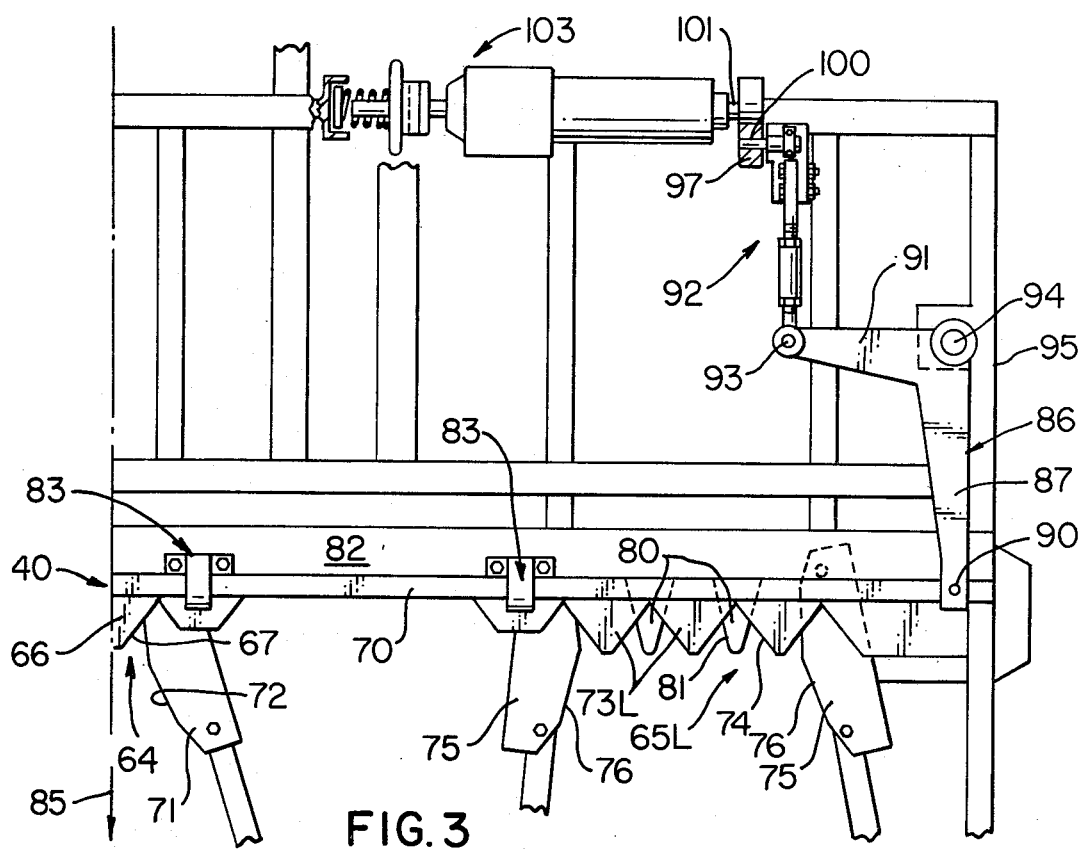
FIG. 3 is a top plan view illustrating the left-hand side of cutting means of the attachment of FIG. 2 and particularly illustrating the actuating means associated therewith (left and right being from the point of view of the driver or operator)

The central cutting section 64 is comprised of a single roughly V-shaped or triangular cutting knife 66 having opposed inclined cutting edges 67 and the knife 66 is suitably detachably fastened to a bar 70 which extends completely across the throats of cooperating pairs of intermediate walls of the three plant-receiving passages. FIG. 3 shows only the left-hand half of the cutting means. The right half is symmetrical in relation to the left half. The knife 66 cooperates with a pair of associated stationary knives 71 (one shown in FIG. 3) positioned on opposite sides of the central passage 36 and each stationary knife 71 has a cutting edge 72 so that each plant entering the central passage 36 is severed between a set of cooperating edges such as 67 and 72.

The cutting section such as cutter 65L is associated with a side passage and is comprised of a plurality of three substantially V-shaped or triangular cutting knives 73L each having opposed cutting edges 74. The knives 73L are suitably detachably fixed to the bar 70. The knives 73L cooperate with a pair of stationary knives 75, each having a cutting edge 76, the stationary knives being arranged at opposite sides of the plant-receiving passage 37L. The three cutting knives 73L also cooperate with a pair of wedge-shaped or triangular stationary guards 80, each having sharp, top cutting edges 81 defined by undercutting the top surface at the side edges thereof. The stationary guards 80 are suitably fixed to the main structure of the attachment 35 immediately beneath the knives 73L. The cutting edges 74, 76 and 81 cooperate to cut plants coming through the side passage 37L.

The bar 70 has the knives 66, 73L and 73R detachably fixed thereto and is supported on a structural member 82 of the attachment 35 by a plurality of supports 83 of a type well known in the art which enable rectilinear reciprocation of the bar 70 and its knives 66, 73R and 73L in a direction transverse and in this example perpendicular to the path or forward direction of harvesting movement of the harvester 20 with such forward direction being designated by the arrow 85. An L-shaped lever device 86 has a comparatively long leg portion 87 rotatably connected to the bar 70 by a pin 90 and a shorter leg portion 91 thereof rotatably connected to an actuating linkage 92 using a pin 93. The device 86 is supported for rotary or pivoting movement about a pivot pin 94 suitably fixed to a structural support 95 at the side of the attachment 35. The actuating linkage 92 may be of any suitable type or construction and in this example is rotatably connected to an eccentric wheel 97 by a shaft 100. The wheel 97 is fixed to a shaft 101 which in turn is rotated by a drive apparatus 103, suitably operatively connected to the power unit or engine 22 of the harvester 20.

Thus, upon rotating the shaft 101, the eccentric wheel 97 is also rotated causing reciprocating pivoting movement of the linkage 92 to thereby pivot or partially rotate the device 86 back and forth, i.e., clockwise and counterclockwise, about its pin 94 and thereby cause reciprocating movement of the bar 70 and its cutting knives 66, 73L and 73R perpendicular to the path of harvesting movement 85.

Figure 5:
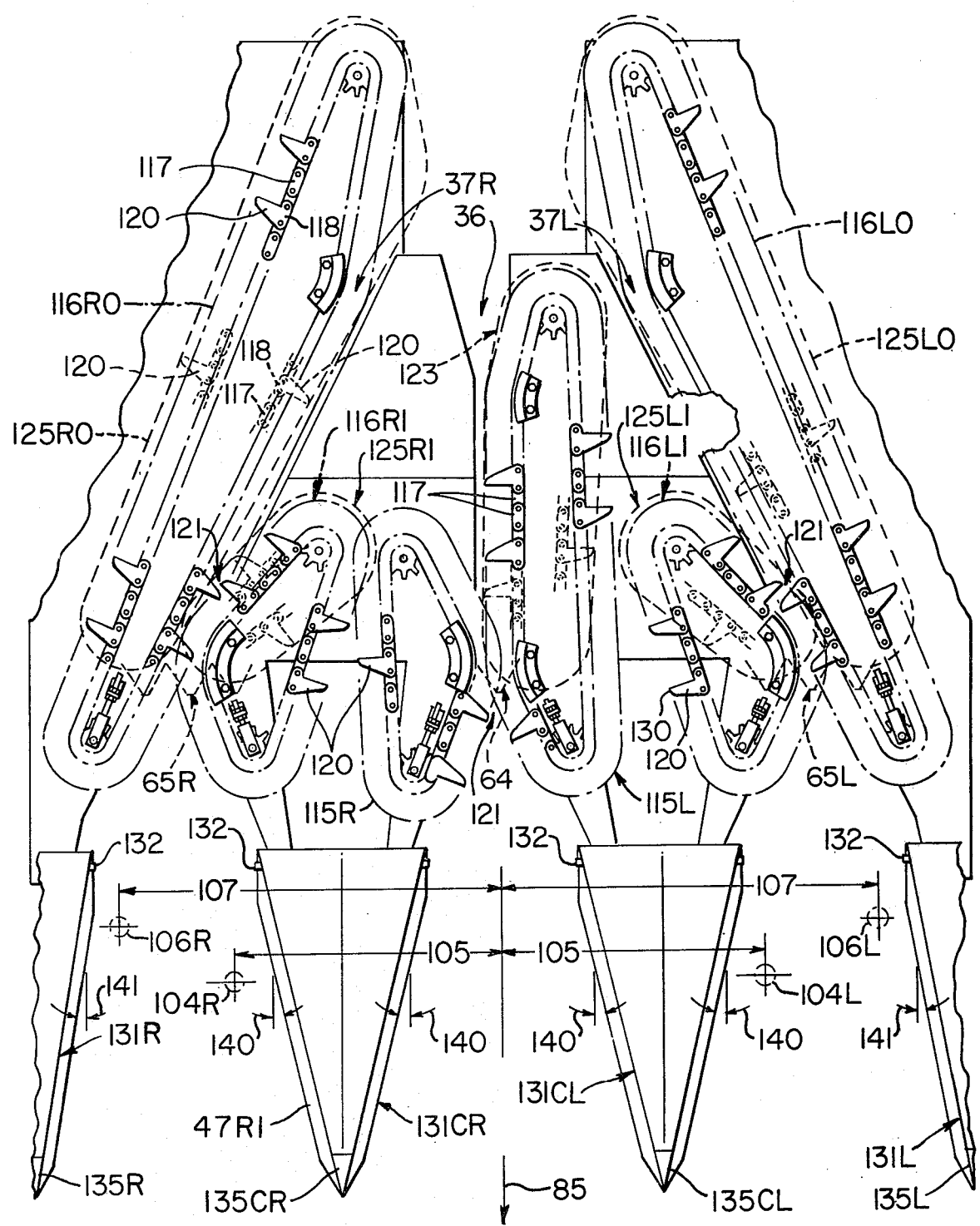
FIG. 5 is a top plan view particularly illustrating the gathering chain system of the attachment of FIG. 2 which system is comprised of an upper level gathering subsystem, having cooperating upper gathering chains the paths of which are shown by utilizing dot-dash lines, and a lower level gathering subsystem having cooperating lower gathering chains the paths of which are shown by utilizing dashed lines.

From the construction and arrangement of the central cutting section 64 and the side cutting sections 65L and 65R, it will be appreciated that plants may have a widely variable spacing from the center of the central passage 36 and yet be efficiently severed or cut by the three cutting sections. In particular, and as illustrated in FIG. 5, plants having row spacing 105, as indicated at 104L may be located in the mouth associated with side passage 37L. Here the rows are spaced a comparatively small distance 105, such as 28 inches, from the center of the central passage 36 and yet can be cut by the cutting section 65L. Similarly, another plant 106L may be located in the mouth of the side passage 37L a comparatively large row spacing distance 107, such as 42 inches, from the center of the central section and also be cut. The same capability exists in the right hand row to cut plants positioned in rows spaced by representative distances 107 and 105, for example. As is well known in the art, the cutting is achieved when the harvester attachment 35 is moved forwardly along path 85 so that the stalks of the plants engage the cutting knives and are severed by the reciprocation of bar 70 and its cutting knives 66, 73L and 73R in the manner described above.

It will be readily apparent from the drawings that the construction of the side passages is such that plants are free to be received in the comparatively wide cut-off areas 50L and 50R (see FIG. 2) so that the base of each plant may be readily engaged by an associated knife section yet with minimum bending of the plant by adjacent portions of the attachment 35.

As indicated earlier, the attachment 35 has gathering means or a system for gathering plants entering the central passage 36 and the two side passages 37L–37R. The gathering system comprises a first or upper-level gathering subsystem, designated generally by the collective reference numeral 113 in FIG. 1 for grasping the plant stalks at a substantial height above the ground. Gathering chains, to be described hereinafter, of the first subsystem 113 have their paths shown by dot-dash lines 115L, 115R, 116LO, 116RO, 116LI and 116RI. The gathering system also comprises a second or lower-level gathering subsystem designated generally by the collective reference numeral 114 in FIG. 1 for grasping the cut stalk ends of the plants adjacent the effective level of the cutting means 40. The gathering chains, to be described hereinafter, of the second subsystem 114 have their paths shown by dashed lines 123 and 125LO, 125LI, 125RO and 125RI in FIG. 5.

The first gathering subsystem 113 of this example comprises a top pair of cooperating gathering chains, positionally shown by dot-dash lines, 115L and 115R, associated with the central passage 36 and pairs of cooperating gathering chains, positionally shown by dot-dash lines, 116LO, 116LI, 116RO and 116RI, each pair being associated with a side passage. These chains in subsystem 113 have plain links 117 and other links 118 at predetermined intervals and the links 118 have integral gathering fingers 120. For simplicity, only a few representative links 117 and 118 have been illustrated.

Thus, with the attachment 35 in its down or downwardly inclined position, as illustrated in FIG. 1, each of the top chain pairs, represented in FIG. 5 by dot-dash lines, 115R-115L, 116LO-116LI and 116RO-116RI, is adapted to engage and confine each plant coming within its associated passage between cooperating gathering fingers 120 at a level which is a substantial distance above ground level G. It will be appreciated that each pair of cooperating gathering chains in the upper-level subsystem 113 has fingers 120 which intermesh as shown in several typical locations designated 121 in FIG. 5, for example, to assure unobstructed operation of the chains and confinement of plant stalks between each cooperating pair of fingers 120.

The second or lower gathering subsystem 114 of this example comprises a single lower gathering chain 123, positionally represented by dash lines, associated with the central passage 36 (see FIG. 5). Lower chain 123 cooperates with a spring-biased bar 124 (see FIg. 2) anchored to a bracket on the frame structure (not shown). The spring bar 124 serves to urge the bottom portions of the stalks toward the gathering chain 123 whereby the fingers, also designated 120, of the bottom chain 123 engage and move the cut end portion of the stalks through central passage 36.

The second or lower gathering subsystem 114 also comprises a low level chain set or pairs of gathering chains 125LO, 125LI, 125RO and 125RI, positionally represented in FIG. 5 by dash lines, associated with the side passages. The chains of each pair are particularly adapted to engage the cut end portions of the plants immediately after cutting thereof by the cutting means 40. Each chain of the lower subsystem has gathering fingers also designated by the reference numeral 120. The fingers of each pair of chains 125LO-125LI, represented by dash lines, intermesh to place bottom cut portions of associated plants between cooperating pairs of fingers, yet in such manner that the fingers 120 do not obstruct or interfere with the movement of the chains of the subsystem 114. Chains 125RO and 125RI function in a similar manner.

To assure that the plants are conveyed through the attachment 35 with the cut stalk ends first, the chains of the lower gathering subsystem 114 are operated at speeds faster than the gathering chains of the upper gathering subsystem 113. Accordingly, as each plant is received within an associated passage it is engaged in spaced relation above the ground G and confined between a pair of fingers 120 so that with continued movement of the harvester 20 and the attachment 35 along the harvesting path 85 the tops of the plants are stabilized vertically or slightly inclined forwardly in the direction of the path 85. Immediately thereafter, the cutting means 40 cuts the plant stalks and the lower subsystem 114 of gathering chains operating at a faster speed than the upper subsystem 113 grasps and rapidly pulls the cut plants, stalk end first, through the attachment 35 and into the conveying means 24 for conveyance to the chopper 25 of the harvester 20.

Figure 7:
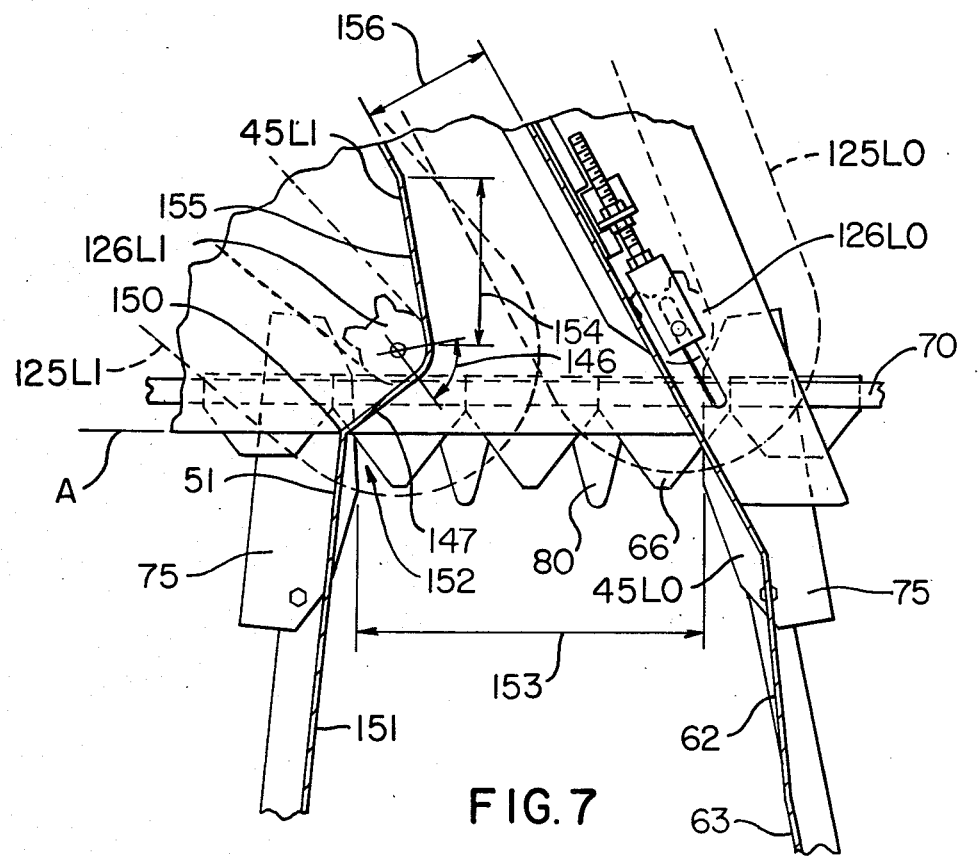
FIG. 7 is a composite view, with parts in cross section and parts broken away, of the left-hand side plant receiving passage illustrated in FIG. 6, the opposite side passage being substantially identical though symmetrically arranged.
Figure 8:
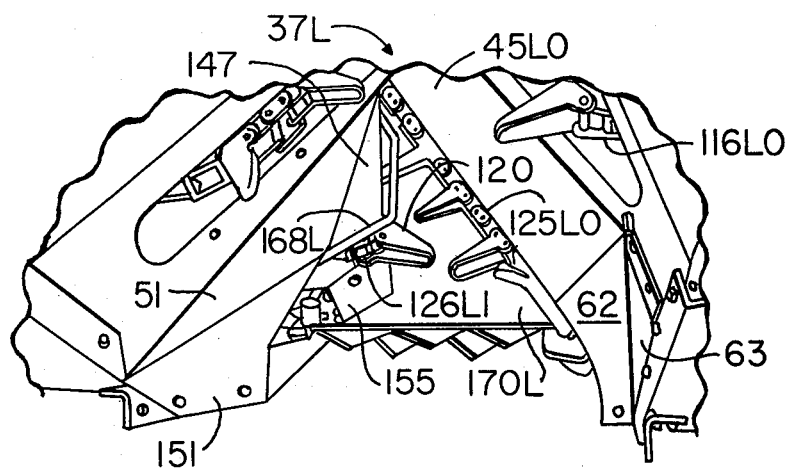
FIG. 8 is a fragmentary perspective view of the left-hand passage looking down and into the passage from a position of observation in front of the left-hand passage 37L, shoes 131L and 131CL being removed.

To further assure the sweeping of the stalks through the wide cut-off areas of each side passage, for example passage 37L, the lower gathering chains 125LI-125LO associated with that side passage 37L are trained on sprocket wheels 126LI and 126LO (FIG. 7) mounted so that they are arranged within the confines of its intermediate walls. Wheel 126LO is as shown at location 127 in FIG. 6. The wheel 126LI is shown in FIGS. 7 and 8. The tips 130 of the fingers 120 are adgacent the cut-off area 50L as the fingers 120 enter through the side walls of the associated intermediate section side passages 44R and 44L. It will be appreciated that all forward sprocket wheels, in both upper and lower subsystems, except 126LI and 126RI, are adjustable to control the tension in the associated chains. The paths of the tips of the cooperating fingers associated with chains 125LI and 125LO are as shown in FIGS. 5 and 7. Note the inwardly directed sweeps of the fingers across the cutting zones.

Once each plant is cut by the cutting means 40 and with continued movement of the attachment 35 and harvester 20 along the harvesting path 85, the recessed arrangement of the sprockets 126LO and 126LI assures immediate entrance of cut crop into the associated passage 37L in a non-choking manner and immediate pick-up by opposed fingers 120 on chains 125LO and 125LI.

As will be readily apparent from FIG. 2 of the drawings, the attachment 35 has a plurality of four outwardly or forwardly converging or tapering sections or shoes 131R, 131CR, 131CL and 131L. Each shoe is suitably pivotally fastened to associated structure of the attachment 35 using an associated rod 132. The extent of pivoting movement of each shoe about its rod and away from the ground is limited by the rear edge of the shoe engaging an immediately subjacent part of the attachment 35, while the extent of pivoting movement toward the ground is also suitably limited by conventional structure, not shown.

Shoes 131R and 131CR (FIG. 2) have side walls 47RO and 47RI (FIG. 5) which define the outwardly diverging mouth of the right-hand passage. Shoes 131CR and 131CL (FIG. 2) have side walls 47CR and 47CL which define the mouth of the center passage. Shoes 131CL and 131L have side walls 47LI and 47LO, respectively, which define the left-hand mouth. The tops of the shoes are formed by intersecting sheets, such as 133, which slope toward the front. The shoes terminate in bearing points 135R, 135CR, 135CL and 135L, respectively. Again, it will be understood that when one of the side passages is chosen for detailed description, for purposes of illustration, the other side section is arranged in a symmetrical manner. The pivotal mounting of the shoes on the rods 132 and the mouths formed by the diverging side walls of the shoes assure optimum engagement and upward movement of the leaves of a plant being harvested as the harvester moves along the harvesting path while maintaining and assuring that the associated plants remain in an upright manner so that as the stalks of the plants approach the cutting means the plants are cut with optimum efficiency immediately adjacent the ground to produce the minimum cut stalk height indicated at 41 in FIG. 1.

It will also be seen that the attachment 35 has an upwardly domed top or upper wall portion behind each pivotally mounted shoe. In this example a domed wall such as 136L is provided immediately behind each outer shoe and a domed wall such as 137CL is provided behind each intermediate shoe. Each side domed wall such as 136L has a curved outwardly convex configuration and each center domed wall such as 137CL is comprised of a plurality of cooperating planar sections, as illustrated in FIG. 2.

Dividers are formed by the four shoes and the dome and wall structures on which the shoes are mounted.

Figure 9:
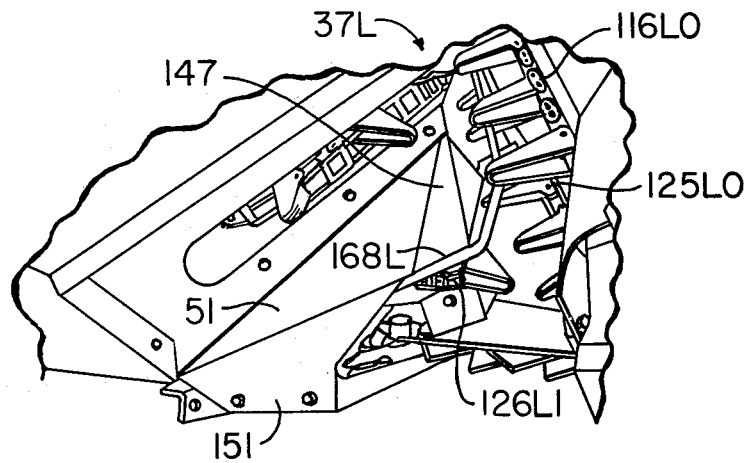
FIG. 9 is a fragmentary perspective view of the left-hand passage looking down and toward the left, from a position of observation in front of the left-hand passage 37L, shoes 131L and 131CL being removed.

Spring-biased pressure bars 168L and 168R are provided in the side passages in order to urge the stalks in an outboard direction as they are transported rearwardly. In each case the pressure bar is below the main part of the shoulder and wall section formations 147, 155 conforming thereto in shape and then continuing rearwardly through its respective side passage, the spring bias being such as to urge the main body of each brace bar toward the outboard wall of its respective passage (FIGS. 8, 9).

The plant gathering means has been illustrated and described in this disclosure as being in the form of gathering chains operated on suitable toothed sprocket wheels. However, it is to be understood that such gathering means need not necessarily be gathering chains but may be in the form of endless belts having resilient teeth, or may accord with any other technique capable of being employed to move plants through an attachment such as the attachment 35.

The expression "gatherer" is used herein collectively to designate either chains or endless belts.

Particular attention is now directed to FIG. 7 and specifically to shoulder 147 which curves toward the narrow portion of the left side passage at 146. Specific attention is further directed to the fact that the mouth at dimension A is relatively wide, for reasons indicated above. Stalks positioned relatively close to the inboard wall of the left-hand passage (FIG. 7) will be swept along shoulder 147, immediately upon cutting and promptly picked up by chains 125LI and 125LO, because of the location of the sprockets 126LI and 126LO of the lower chain system immediately adjacent the cutting means. Not that the dashed lines in FIG. 7 define the paths pursued by the outer tips 130 of the fingers 120 of links 118 of chains 125LI, 125LO. These fingers sweep across the cutting area and it is this sweeping action, taken together with the wide mouth and the shoulder 147 formation, that render the operation of this attachment satisfactory over a wide range of row widths. Again, comments made with reference to the left-hand passage of FIG. 7 are equally applicable to the right-hand passage, symmetry being postulated.

In this disclosure of the invention the cutting means is illustrated and described as comprising a bar 70 having suitable saw-toothed cutting blades fixed thereon and such bar 70 and saw-toothed cutting blades are reciprocated back and forth perpendicular to the direction of harvesting movement 85 of the harvester 20. However, it will be appreciated that the cutting means may be of any suitable type provided that a comparatively wide throat cutting area is maintained immediately behind the cutting means of the side passages.

The fixed non-adjustable, three-row narrow and wide-row crop attachment of this invention may be provided to harvest not only crops set in rows but crops that are planted in what may be considered as beds, whereby each bed is in essence a row of crops having a substantial width provided the width of each bed is such that the crops may be readily received within the central passage 36 and yet be within the side passages with innermost plants of the side passages being no less than approximately 24 inches from the center of the central passage 36 and outermost plants of the side passages being no more than 42 inches from the center of the central passage 36.

These dimensions of 24 inches and 42 inches representing minimum and maximum dimensions of plants from the center of the central passage 36, in essence, specify generally that the distance between rows may vary generally of the order of one foot, and more. Thus, for these particular dimensions the range of spacings between rows of row crops may be as much as 18 inches with the attachment 35 of this invention providing a satisfactory severing action.

The attachment 35 of this invention is particularly adapted to be used on a harvester 20 which pushes (as opposed to pulling) such attachment through a planted field of row crops. Such attachment 35 has suitable quick connect and disconnect means which enables such attachment to be readily installed and removed from its associated harvester 20.

To facilitate an understanding of this invention the following typical representative parameters employed in one successful embodiment of this invention are provided. In particular, the distance between centers of adjacent conical bearing points, such as 135R and 135CR, in such embodiment is 34 inches. Further, inasmuch as the forward end of the harvester attachment 35 is movable vertically upwardly and downwardly in a pivoting manner about the rear portion thereof by suitable mechanisms (not shown) and as is well known in the art, the range of heights of the lower cutting knives 66, 73R and 73L above ground level G ranges between 2½ inches and 20½ inches. Because of this upward and downward pivoting movement of the attachment 35 the lower gathering chain subsystem 114 above ground ranges between 3½ inches and 21½ inches. In such successful embodiment the included angle between the outer wall portions 47CR and 47CL of the outer portion 46C of the central passage 36 is 32 degrees due to the angle 140 being 16 degrees, as shown approximately in FIG. 5. Similarly, the included angle between the outer wall portions 47LI and 47LO of the outer portion 46L of the left side passage 37L is 28½ degrees due to the angles 140 being 16 degrees and each angle 141 being 12½ degrees. In such successful embodiment and in side passage 37L the spacing 143 (see FIG. 4) between the uppermost and lowermost chains of the chain subsystems 113 and 114, respectively, is 18 inches while the spacing 144 between the most closely adjacent chains of such subsystems 113 and 114 is 14 inches. The vertical spacing between effective medial planes of cooperating chains of the lower chain subsystem of each side passage, such as 37L, is shown at 145 (FIG. 4) and is 2 inches. In considering the central passage 36 and in particular the right side thereof, as viewed in FIG. 2, the uppermost and lowermost chains of the chain subsystems 113 and 114 are vertically spaced apart 18 inches.

As previously mentioned, the inboard forward part 51 of side passage 37L is inclined at a greater angle than the other oppositely arranged or outer forward part 62 to help define the comparatively wide cut-off area at the bottom of its side passage 37L. Further, and as illustrated in FIGS. 7, 8 and 9, the forward part 51 is contiguous to a shoulder 147 having a curved wall portion 146. A pan 170L slopes rearwardly and upwardly to define the floor of the left side passage (FIG. 8), the front edge of the pan overlying the rear portions of knife 73L. Wall portion or shoulder 147 starts at a wall bend line 150 which, progressing upwardly from pan 170L, is canted away from the normal to pan 170L with rearward and outboard inclinations. The reference line A is the front edge of pan 170L. It will be understood that the right-hand passage has a similar bottom pan symmetrically arranged. Also, the central passage is suitably bottomed. The width 153, an important parameter, is provided for by shaping the forward portion 51 and wall portion 147 to define a concavity 152 which is inwardly of the slight concavity in 62. Width 153 is the distance between stationary knives 75, arranged at opposite sides of each side passage. In one successful embodiment of this invention, as discussed above, the maximum width 153 is 13 inches.

The dimension 154 in the preferred embodiment is 6 inches. The wall portion 155 at its inner end blends smoothly with the remainder of the wall of the inner section 42L (FIG. 6) and such inner section 42L has a substantially uniform width, indicated at 156, which is generally of the order of 5½ inches (FIG. 7). Thus, it is seen that the construction and arrangement of the attachment 35 are such that the oppositely arranged concavities in 62 and at 152 cooperate to assure provision of the comparatively wide cut-off area at the bottom of each associated side passage.

While present exemplary embodiments of this invention and methods of practicing the same have been illustrated and described, it will be recognized that this invention may be otherwise variously embodied and practiced within the scope of the following claims.

The expression forage harvester unit is herein employed collectively to designate either an attachment per FIG. 2 or the like and such a structure as incorporated in a self-propelled forage harvester.

We claim:

1. A forage harvester unit adapted to move forwardly to harvest simultaneously three rows of crops spaced from one another by a distance within a range of 28 to 42 inches, comprising:
 a main body having
  a left hand outer divider,
  a left hand inner divider,
  a right hand inner divider and
  a right hand outer divider,
   the left hand dividers having opposed walls extending forwardly and outwardly to the left and successively defining a channel section and diverging throat and mouth sections forming a left hand crop receiving passage, the inner dividers having opposed walls extending forwardly and successively defining a channel section and diverging throat and mouth sections forming a central crop receiving passage, and the right hand dividers having opposed walls extending forwardly and outwardly to the right and successively defining a channel section and diverging throat and mouth sections forming a right hand crop receiving passage;
 left hand cutter means disposed across the left hand throat,
 central cutter means disposed across the central throat and
 right hand cutter means disposed across the right hand throat,
   the central cutter means being adapted to cut the center row of a three row group of crops, the left hand and right hand throat sections and cutter means each having a width substantially greater than the width of the central throat section and cutter means, so that the harvester requires no adjustments to harvest variously spaced groups of three rows of crops within said range;
 an upper pair of gatherers individually operatively positioned along the opposed walls of the left hand passage,
 a second upper pair of gatherers individually operatively positioned along the opposed walls of the right hand passage,
 a lower pair of gatherers individually operatively positioned along the opposed walls of the left hand passage,
 a second lower pair of gatherers individually operatively positioned along the opposed walls of the right hand passage, and
 gathering means in the central passage, the lower pair of gatherers in the left hand passage sweeping across and over the left hand cutter means, the lower pair of gatherers in the right hand passage sweeping across and over the right hand cutter means; the inboard wall of the left hand passage being formed with an outboard extending shoulder proximate to the left hand cutter means and the inboard wall of the right hand passage being formed with an outboard extending shoulder proximate to the right hand cutter means.

2. A forage harvester unit in accordance with claim 1 in which the combined widths of both right and left hand throat sections approximate the difference between the maximum and minimum expected spacings of the outer rows to be harvested and in which each of the left hand and right hand throat sections is fully spanned by its respective cutter means.

3. A forage harvester unit adapted to move forwardly simultaneously to harvest three rows of crops spaced from one another by a distance within a range of 28 to 42 inches, comprising:

a main body having
- a left hand outer divider,
- a left hand inner divider,
- a right hand inner divider and
- a right hand outer divider, the left hand dividers having opposed walls extending forwardly and outwardly to the left and successively defining a channel section and diverging throat and mouth sections forming a left hand crop receiving passage, the inner dividers having opposed walls extending forwardly and successively defining a channel section and diverging throat and mouth sections forming a central crop receiving passage, and the right hand dividers having opposed walls extending forwardly and outwardly to the right and successively defining a channel section and diverging throat and mouth sections forming a right hand crop receiving passage;

left hand cutter means disposed across the left hand throat, central cutter means disposed across the central throat and right hand cutter means disposed across the right hand throat, the central cutter means being adapted to cut the center row of a three row group of crops, the left hand and right hand throat sections and cutter means each having a width of at least 13 inches and substantially greater than the minimum width dimension which the central throat section and cutter means must have in order to accept a row of crop, so that the harvester requires no adjustments to harvest variously spaced groups of three rows of crops within said range;

an upper pair of gatherers individually operatively positioned along the opposed walls of the left hand passage, a second upper pair of gatherers individually operatively positioned along the opposed walls of the right hand passage, a lower pair of gatherers individually operatively positioned along the opposed walls of the left hand passage, a second lower pair of gatherers individually operatively positioned along the opposed walls of the right hand passage, gathering means in the central passage, the lower pair of gatherers in the left hand passage sweeping in overlapping divergent paths across the left hand cutter means, the lower pair of gatherers in the right hand passage sweeping in overlapping divergent paths across the right hand cutter means;

the inboard wall of the left hand passage being formed with an outboard extending shoulder proximate to the left hand cutter means and the inboard wall of the right hand passage being formed with an outboard extending shoulder proximate to the right hand cutter means.

* * * * *

UNITED STATES PATENT AND TRADEMARK OFFICE
CERTIFICATE OF CORRECTION

PATENT NO. : 4,160,355

DATED : July 10, 1979

INVENTOR(S) : Nathan L. Blake and Robert A. Stelzer

It is certified that error appears in the above-identified patent and that said Letters Patent are hereby corrected as shown below:

Column 1, line 17, please insert ---either--- after "If."

Column 2, line 68, please insert ---of Fig. 2--- after "tachment."

Column 4, line 16, please insert ---or mouth--- after "section."

Column 4, lines 17 and 18, please delete "or mouth" after "section" in line 17.

Column 10, line 7, please change "Not" to ---Note---.

Signed and Sealed this

Ninth Day of October 1979

[SEAL]

Attest:

RUTH C. MASON
Attesting Officer

LUTRELLE F. PARKER
Acting Commissioner of Patents and Trademarks